Patented Feb. 24, 1948

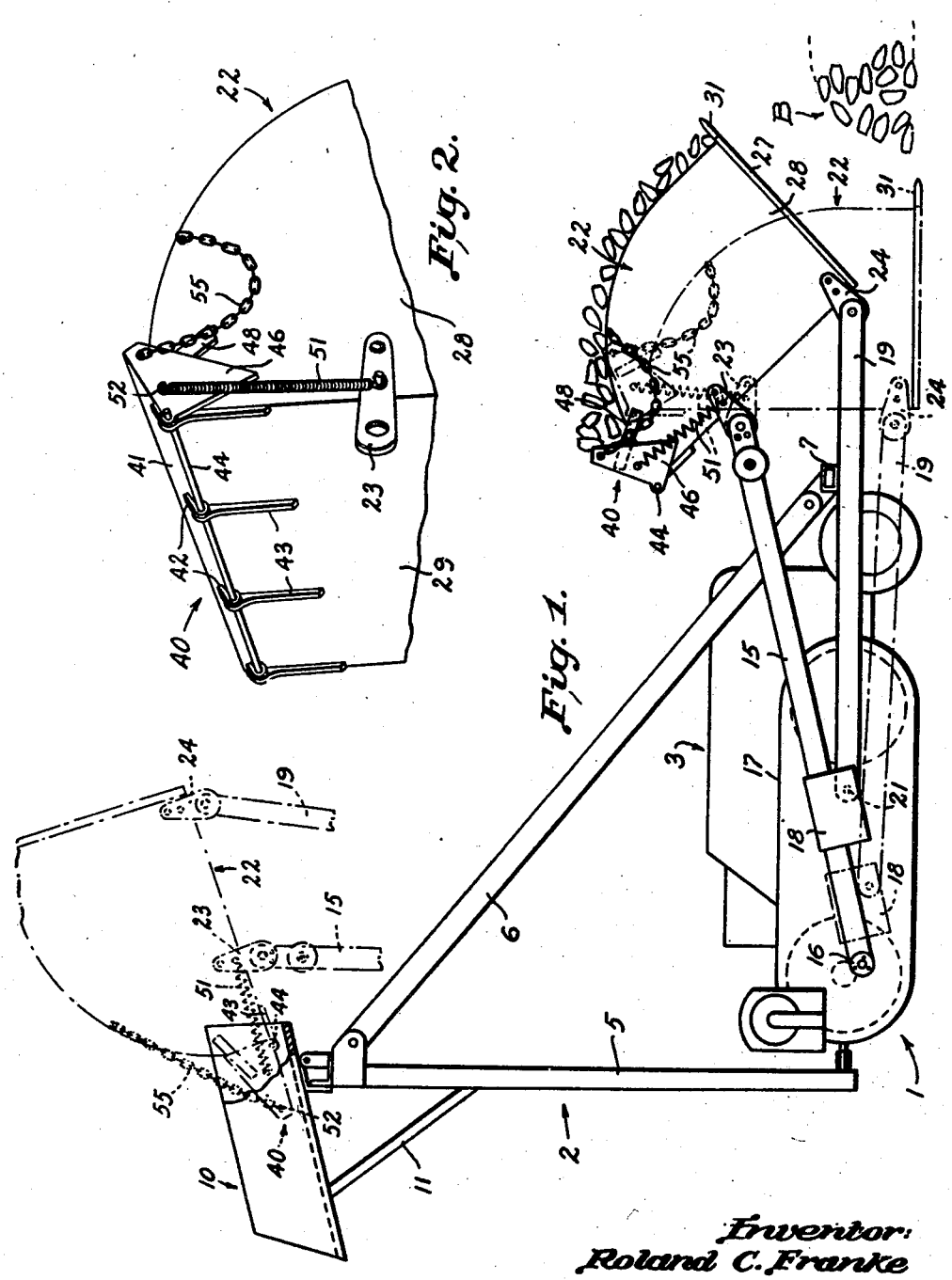

2,436,718

UNITED STATES PATENT OFFICE 2,436,718

MATERIAL HANDLING APPARATUS

Roland C. Franke, Mullen, Nebr.

Application June 15, 1945, Serial No. 599,728

6 Claims. (Cl. 214—140)

The present invention relates to material handling apparatus and is more particularly concerned with loaders for sugar beets and the like.

The object and general nature of the present invention is the provision of an auxiliary gate for the scoop of a beet loader for the purpose of increasing the effective capacity of the machine and for preventing the beets or other material being handled from spilling out of the hopper. More particularly, it is a feature of my invention to provide a loader scoop or hopper with an auxiliary gate which prevents the beets from spilling out until the scoop or hopper reaches its discharge position but which, when the hopper is in its discharge position, does not materially interfere with the rapid discharge of the scoop.

These and other objects and advantages of my invention will be apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a side view, partly diagrammatic, of a loader for loading sugar beets from stock piles into adjacent cars, it being understood that the present invention is not limited to loaders for sugar beets, in which the principles of the present invention have been embodied.

Figure 2 is a perspective view of the auxiliary gate.

Referring now particularly to Figure 1, I have shown my invention by way of illustration as embodied in a loader for sugar beets. The loader, indicated in its entirety by the reference numeral 1, comprises a chute frame 2 mounted on a crawler tread tractor 3. The frame 2 includes a pair of vertical standards 5 and forwardly and downwardly extending beams 6 which at their lower ends are connected to a cross bar 7 carried at the front of the tractor 3. The chute 10 is fixed to the upper ends of the beams 5 and 6 and is braced by pieces 11.

The loader 1 also includes a pair of side arms 15 pivoted at 16 to the truck frames 17 of the tractor and carrying slides 18 to which the rear ends of a pair of pusher bars 19 are pivoted, as at 21. A scoop or hopper 22 is pivoted to the outer ends of the bars 15 and 19, as by pairs of brackets or lugs 23 and 24 fixed to the hopper. The latter includes a bottom wall 27, a pair of side walls 28, and a back or rear wall 29. The forward edge of the bottom wall 27 has a plurality of loading teeth 31.

The structure so far described is substantially the same as the loader shown in my prior U. S. Patent No. 2,330,041, issued September 21, 1943, to which reference may be made if necessary.

The loader is operated in the following manner. The loader controls are actuated so as to lower the hopper 22 into a loading position, as shown in dotted lines in the lower part of Figure 1. The cables, sheaves, power plant, controls and the like are omitted from Figure 1, but it will be understood that when the hopper 22 is in its lower dotted line position, the tractor may be advanced toward a pile of beets B (Figure 1) so as to cause the latter to be loaded into the hopper or scoop over the loading edge 31. The hopper is then tilted upwardly, substantially into its full line position, and then swung upwardly and rearwardly over the tractor until the hopper lies just above and closely adjacent the dumping chute 10. Then by increasing the tilt of the hopper, as by further extending the slides 18, the beets are dumped by gravity from the hopper and through the chute into the cars (not shown) underneath the chute.

Coming now to the particular feature of the present invention, I provide means for increasing the effective capacity of the hopper and to prevent the beets from spilling off the hopper during its transit from loading position (lower dotted line position) to dumping position (upper dotted line position). Such means in the preferred form of the present invention takes the form of an auxiliary gate 40 comprising a plate 41 having one or more hinge bars 42 fixed, as by welding, thereto and cooperating with companion hinge bars 43. The two sets of hinge bars 42 and 43 are apertured to receive a long bar or rod 44 serving as a pintle. Generally triangular side or end plates 46 are fixed to or form a part of the two ends of the gate plate 41 and are dimensioned to overlap the sides 28 of the hopper.

A pair of bars or brackets 48 are fixed, as by welding, to the hopper sides 28 and serve as stops for limiting the downward or inward swinging of the gate 40, as shown in full lines in Figures 1 and 2. The gate is normally held in this position by a pair of springs 51 connected to the end plates 46 of the gate 40 by studs 52 or other suitable means. Preferably, the studs 52 are so disposed relative to the pivot pin 44 that when the gate is closed a line connecting each stud 52 with the associated end of the pin 44 lies at a right angle to the associated spring 51. The springs are therefore in a position to hold the auxiliary gate closed while the hopper 22 is in its transit position, thereby carrying over the maximum quantity of beets without spilling. However, when the hopper is tilted up into its discharge position (upper dotted line position, Figure 1), the weight of the beets in the hopper bears against the gate and is sufficient to swing the latter down into its discharge position against the tension exerted by the springs 51. In this position the studs 52 move downwardly closely adjacent a straight line or over-center position with respect to the pivot pintle 44, a position that is limited or defined by a pair of stop chains 55 connected between the gate and the side walls 28 of the hopper. The gate end walls 46 overlap the hopper side walls even in the discharge position of the gate but the springs 51 do not tend to return the gate until the hopper is empty, and the hopper tilted, at least partially, back toward its loading position.

Although I have described a specific embodiment of my invention, and have described it in particular reference for loading beets and the like, it is quite apparent that a machine constructed according to my invention may be used for other materials and other operations. Modifications thereof may be made without departing from the spirit and scope of my invention as set forth in the appended claims.

I claim as my invention:

1. In a material loader of the type including a scoop adapted to be loaded from one side and then swung upwardly into a position to discharge by gravity from the other side thereof, an auxiliary gate pivoted to said other side of the scoop and adapted to be opened by the weight of material within the scoop when the scoop reaches dumping position, and spring means yieldingly holding said gate closed until said scoop reaches dumping position.

2. In a material loader of the type including a scoop adapted to be loaded from one side and swung upwardly and over into a position to discharge by gravity from the other side of the scoop, an auxiliary gate pivoted to the other side of said scoop, stop means on the scoop limiting the movement of said gate in one direction, a second stop means limiting the swinging of said gate in the other direction and a spring connected to the said gate and to said scoop and of such strength as to hold said gate in closed position until scoop reaches its discharge position and the weight of the load is born by the said gate.

3. In a material loader, a scoop having an auxiliary gate pivoted thereto, and spring means connected with said gate and tending to hold the same closed until the scoop reaches a dumping position and the weight of material in the scoop is sufficient to open the gate against the action of said spring means, said spring means being connected with said gate at such a point thereon that when the gate is open, said spring means lies close to a dead center position relative to the pivot of said gate.

4. A material loader comprising a scoop swingable from a loading position to a dumping position, an auxiliary gate adapted to remain closed while the scoop is in a position for loading, said gate being pivoted to said scoop, and spring means connected to hold said gate closed but adapted to yield and permit said gate to open when the scoop reaches dumping position and the weight of the material in the scoop bears against said gate.

5. A material loader comprising a scoop adapted to be loaded from one side and discharged from the other side, an auxiliary gate pivoted to the discharge side of said scoop and adapted to be moved into a material-discharging position by the weight of the material during discharging, and a spring for closing said auxiliary gate after the material has been discharged from said scoop.

6. In a material loader of the type including a scoop adapted to be loaded from one side thereof and swung upwardly into a position to discharge by gravity from the other side thereof, an auxiliary gate pivoted to the discharge side of the said scoop, means for limiting the outward swinging movement of the said gate, and a spring connected between the said gate and the said scoop, the strength of the spring being such as will hold the gate in closed position until the scoop reaches its discharge position and the weight of the load against the gate becomes sufficient to cause said gate to open, the point of connection of the spring to the gate, relative to the pivoted connection of the gate to the scoop, being such that the spring lies close to a dead-center position when the gate is in its discharge position.

ROLAND C. FRANKE.

REFERENCES CITED

The following references are of record in the file of this patent:

UNITED STATES PATENTS

| Number | Name | Date |
|---|---|---|
| 1,466,917 | Smith | Sept. 4, 1923 |
| 1,473,109 | Libertini et al. | Nov. 6, 1923 |
| 2,109,440 | Villerup | Feb. 22, 1938 |
| 2,153,781 | Vote | Apr. 11, 1939 |
| 2,208,205 | Biedess | July 16, 1940 |
| 2,307,717 | Woodbury | Jan. 5, 1943 |
| 2,413,124 | Van Voorhis | Dec. 24, 1946 |